(No Model.)

C. A. McEVOY.
CLEAT FOR HOLDING ROPES, CORDS, OR CHAINS.

No. 533,603.  Patented Feb. 5, 1895.

Witnesses
Guy E. Davis
B. W. Miller

Charles A. McEvoy
Inventor
by his attorneys
Baldwin Davidson & Wight

UNITED STATES PATENT OFFICE.

CHARLES AMBROSE McEVOY, OF LONDON, ENGLAND, ASSIGNOR OF ONE-HALF TO THOMAS WEBSTER, OF SAME PLACE.

CLEAT FOR HOLDING ROPES, CORDS, OR CHAINS.

SPECIFICATION forming part of Letters Patent No. 533,603, dated February 5, 1895.

Application filed October 22, 1894. Serial No. 526,561. (No model.)

*To all whom it may concern:*

Be it known that I, CHARLES AMBROSE MC-EVOY, engineer, a subject of the Queen of Great Britain, residing at 69 Victoria Street, Westminster, London, England, have invented certain new and useful Improvements in Cleats for Holding Ropes, Cords, or Chains, of which the following is a specification.

This invention has mainly for its object to construct a cleat not only in such a manner that a rope, cord or chain having tension upon it can be rapidly and securely locked to it but also in such a manner that if the taut end of the cord, rope or chain is allowed to slacken and there is any tension on the opposite end of the cord the cord shall still be locked and impeded from being drawn past the cleat the same portion of the cord remaining held by the cleat whether the cord be pulled in one direction or the other, The cleat is formed with a broad base plate whereby it may be fixed in position—with a tapering metal pillar extending outward from the base plate—at right angles to it—the smaller end of the pillar being the outer one—and with a concave disk fixed to the outer end of the pillar parallel with the base plate as has before been proposed.

According to my invention I make the pillar of oblong form in cross section and flat on its two larger opposite sides. Its two ends or smaller sides I make to incline at equal angles to the base and the slope of both toward one another I make to quickly increase at a distance from the outer end and then again to decrease so as to form a shoulder on each inclined end. The outer end of the concave disk which is fixed to the top of the pillar I make to extend toward the base plate beyond where the shoulders are formed on the inclined ends of the pillar. When a rope or cord under tension is given one turn round the stem of a cleat so constructed it will slide up the stem until it comes above the shoulder and the portion of the cord which comes between the under side of the disk and the taut cord gets jammed against the disk and is firmly held as in other cleats. If the cord slackens and there is tension on the opposite end of the cord the cord will not be drawn around the stem but will remain stationary—the portion that before was nipped against the disk now nipping the portion of the cord over which it laps either against the broad flat side of the stem or against the shoulder or against both.

The drawings annexed show a cleat constructed in the above manner.

Figure 1:
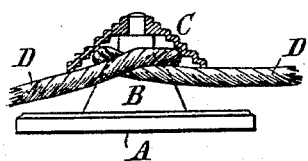
Figure 4:
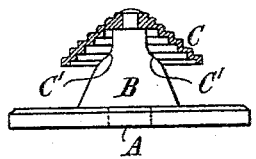
Figure 2:
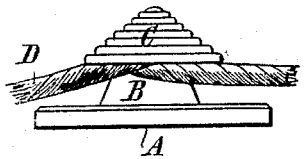
Figure 3:
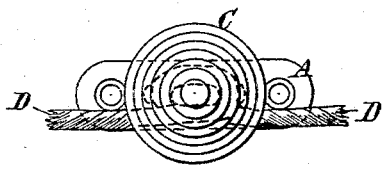

Figure 1 is a longitudinal section; Fig. 2, a side elevation, and Fig. 3 a plan of the cleat and rope held by it. Fig. 4 is a longitudinal section and Fig. 5 an end view of the cleat alone. Fig. 6 is a longitudinal section of a modified form of the cleat.

A is the base plate which may be oblong as shown or circular or of other desired form; B, the tapering stem; C, the concave disk secured to the outer end of the stem; C', the shoulder formed near the outer end of the stem and D is a cord wound around the stem B.

Preferably the inner surface of the concave disk is corrugated with corrugations extending around it.

Figure 5:
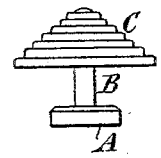
Figure 6:
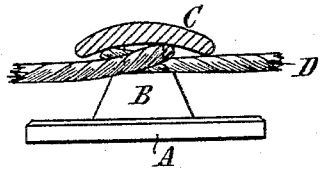

If slightly more than one complete turn around the pillar is given to the rope to lock and hold it then the flat sided pillar might be formed without the notch at the top—or if after forming a notch around the upper end of the pillar the extreme end of the pillar is made to incline outward as shown in Fig. 5 then the pillar might be circular in cross section and not flat sided.

Cleats constructed as above described are especially applicable for use on sailing boats for holding ropes as they act well in whatever position they are fixed, in addition to possessing the advantage of holding the rope without its being able to slip in either direction whichever end of the rope may be pulled on.

The cleats can also be used for holding window blind cords and for other such like uses.

What I claim is—

1. A cleat composed of a base plate, a pillar oblong in cross section extending from it, the two narrower sides or ends of which are inclined toward one another at equal angles to the base and have a shoulder formed on them near their outer ends and of a concave disk fixed on the end of the pillar with its concave side toward the base plate substantially as described.

2. A cleat composed of a base plate—a pillar of oblong form in cross section extending from it—the two broader sides of the pillar being flat and at right angles to the base and the two narrower sides or ends inclined toward one another at equal angles to the base and of a concave disk at the end of the pillar with its concave side toward the base plate substantially as described.

CHARLES AMBROSE McEVOY.

Witnesses:
THOMAS LAKE,
W. M. HARRIS.